J. H. GLAUBER.
FAUCET.
APPLICATION FILED JUNE 29, 1912.
1,087,654.
Patented Feb. 17, 1914.
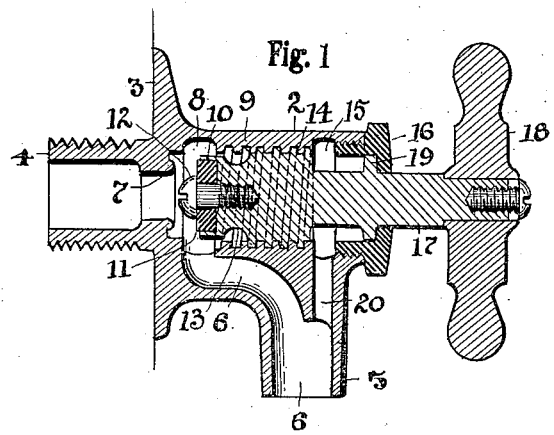
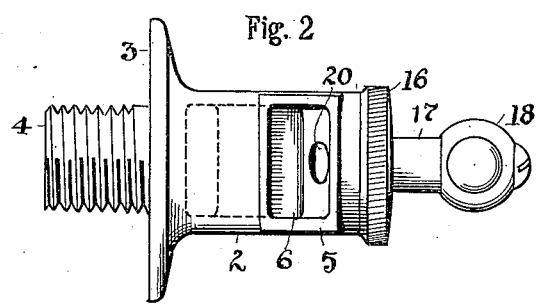
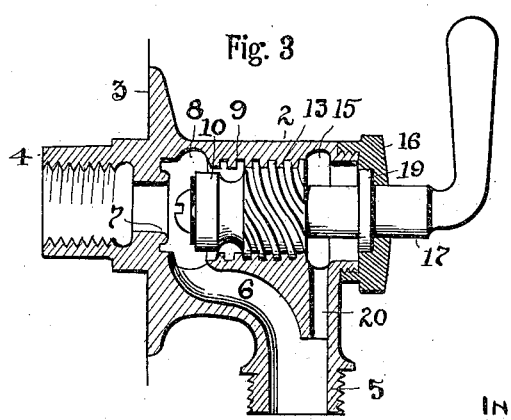
ATTEST
INVENTOR
Joseph H. Glauber
BY
ATTYS.

UNITED STATES PATENT OFFICE.

JOSEPH H. GLAUBER, OF CLEVELAND, OHIO.

FAUCET.

1,087,654.  Specification of Letters Patent.  Patented Feb. 17, 1914.

Application filed June 29, 1912. Serial No. 706,635.

*To all whom it may concern:*

Be it known that I, JOSEPH H. GLAUBER, citizen of the United States, residing at Cleveland, in the county of Cuyahoga and State of Ohio, have invented certain new and useful Improvements in Faucets, of which the following is a specification.

My invention relates to improvements in faucets, and the improvements comprise the construction and arrangement of parts substantially as herein shown and described and more particularly pointed out in the claims.

The object of the invention is to provide a faucet of very compact construction, which at the same time will have a relatively long water spout to avoid splatter and deliver a large volume and a well-formed unbroken flow of fluid, and wherein leakage will be prevented at the stem by an areaway and a leak duct located at the extreme front end of the body of the faucet. As thus located, the leak duct will not be obstructed by the threads of the stem when the valve is open. The faucet is also constructed with a view to avoid difficulties in casting, machining and assemblying, and embodies no intricate parts, making it simple and inexpensive to produce and durable and efficient in use in laundry tubs, bath tubs, water heaters, boilers, and the like.

In the accompanying drawings, Figure 1 is a sectional view centrally through the faucet, showing the valve wide open. Fig. 2 is a bottom plan view projected from Fig. 1. Fig. 3 is a sectional view substantially the same as shown in Fig. 1 but with the handle made integral with the valve stem and the spout round and threaded.

As delineated, the faucet comprises a short body 2 of cylindrical form having a base flange 3 and a screw-threaded coupling extension 4. A short spout 5 of rectangular shape is projected downwardly on straight lines at the extreme front end of body 2, and the rectangular passage 6 of the spout is continued rearwardly through the bottom portion of the body to a point approximately opposite the valve seat 7 where it opens into the enlarged bore 8 between said seat and the threaded middle wall 9 of the body. Passage 6 is thus deviated and lengthened in order to re-form the outgoing water into an unbroken solid stream after discharge through the valve seat where it issues in a variable degree dependent upon the position of the valve 10. All spreading and splattering of the outflowing water at the spout is thereby eliminated, and a large outflow of water is also accommodated, notwithstanding the relatively small size of the faucet which is shown full size in the drawings. The length of the faucet is very short but the volume of discharge is very large and in a solid stream.

The valve 10 comprises a recessed head confining a fiber, lead or other suitable washer 11 affixed by screw 12, and as shown, this head is integral with the inner end of the stem 13 which has an enlarged portion 14 provided with deep, square threads engaged with similar threads in the middle portion 9 of the body. The body threads extend only the length of this middle portion 9, the outer cylindrical bore of the body being of greater diameter and partly smooth and partly provided with internal (or external) threads to give screw engagement with a hollow cap 16 through which the reduced portion 17 of the valve stem projects and is rotatably supported thereby. A handle 18 is removably secured to the end of the stem, and a fixed or integral collar or flange 19 is also provided approximately midway of the reduced stem to limit the outward movement of the stem and the valve, and also to seal the opening in the cap about the stem when the valve is fully open. Such sealing is particularly of advantage in a faucet for hose or pipe connections where back pressure must be taken care of. The cap 16 only extends a slight distance into the open end of body 2 leaving an ample areaway 15 for water which may work its way forward around the threads, and a perpendicular leak duct 20 is arranged within the upper front end of the spout in communication with this areaway 15 to carry off all leakage of water about the stem. The leak duct is located beyond the working parts at the front end of the faucet at a point in the delivery passage where the outgoing water has re-formed into a solid stream. This obviously increases the efficiency of the leak duct, as a better aspirating result is obtained from a solid stream than from a broken one. No wear of the threaded parts of the faucet will lessen the aspirating results, in view of the relations of parts as described. This leak duct 20 does not extend the full length of the spout but terminates approximately mid-length thereof at a point slightly below the horizontal portion of passage 6. This arrangement of leak duct at the very end or front of the faucet is of particular advantage in hot water faucets in laundry tubs, etc., in preventing hot or scalding water from leaking at the stem and spurting on the hand when the valve is being opened, or in bath tubs where hot water leaking at the stem may spurt on the bather; the collar 19 also assists in preventing this from occurring. For the same reason a faucet of this kind is of great value in connection with hot water service and where instantaneous or other water heaters deliver water at very high temperatures so detrimental to the packing of the usual faucets. In my faucet no packing is required. The square threads on stem in mesh with the threads in the body of the faucet permit very little leakage at this point, as the pressure of the water against the end of the stem effects good sealing relations between the threads. However, after prolonged use the threaded screw-stem and body may wear but leakage at the cap will still be avoided, as the leak duct is located beyond the interior working parts of the faucet, and the flow of both the leakage and main supply is downward through the same spout, the leakage being direct and at the very extreme front end.

This faucet is also of especial advantage as a sediment cock in draining and removing accumulations of sediment, lime, etc., from boilers, as it not only insures against leakage or danger of scalding when hot water is being delivered but also has no intricate mechanism or parts to become clogged or to be destroyed by the grit, lime, rust, and other accumulation when these are removed.

The construction of the faucet also adapts it to dispensing gasolene, ether, alcohol, and other light or thin liquids, which leak more freely at the threads of the working parts, and which leakage is absolutely checked at the extreme end of the faucet by the areaway 15 and leak duct 20.

This faucet may be made with either a slow or quick thread, and its construction is of particular value where a quick thread is used in that the leakage so apt to occur with a quick thread is reliably taken care of by the leak duct 20 and prevented by collar 19.

In lieu of the form of the handle shown in Fig. 1, I may use a cup-shaped or wheel handle, or one that is slightly oval in shape, and the faucet body may be also formed in various ways to meet different needs and conditions, as for angular or upright use, etc.

What I claim is:

1. In a faucet, a short body of cylindrical form having a valve seat at its base and a short straight spout and a perpendicular leak duct at its extreme front in communication with the spout and a deviated and lengthened delivery passage extending horizontally between the valve seat and spout at the bottom of the body to solidly re-form the fluid before passing the leak duct, and a valve and operating stem movably mounted within said body opposite said valve seat.

2. A faucet having a relatively short tubular internally-threaded body with a straight spout at its front end and a valve seat at its base and having a relatively long discharge passage extending downward from said seat and thence forward and downward to said spout and a perpendicular leak duct at the front of the body and spout, in combination with a valve having a stem provided with a screw-threaded portion and a reduced portion, and a stop for the stem to prevent closing of the leak duct by the screw-threaded portion of the stem.

3. A faucet having a short and straight tubular body with a short and straight spout at the outer extreme end and a valve seat at its other end and internal threads at an intermediate point between said valve seat and its outer end, and provided with an irregular discharge passage extending forwardly along its bottom from said seat to the upper end of said spout to re-form the water into a solid stream after discharge through the valve seat and a leak duct in the extreme front end of said body open to the spout at the end of said irregular passage, in combination with a valve having a screw-threaded stem reduced in part and provided with a stop collar, and a screw cap for the end of said body recessed to receive said collar and open to support the stem.

4. A faucet comprising a short and straight tubular body having a flanged base with a valve-seat therein, a downwardly-projecting spout at its extreme front end, a threaded central portion, and a screw cap, and provided with a perpendicular lead-duct open to the spout between said cap and the outer end of said central threaded portion, and a bottom passage of irregular form and extended length open to the spout and to said tubular body opposite the valve-seat at the inner end of said central threaded portion, in combination with a valve having a threaded enlargement and a reduced stem with a collar to engage the cap, and prevent the enlargement from closing the leak duct, said stem extending through the cap and having a handle at its outer end.

5. A faucet comprising a short cylindrical body having a base flange, a valve-seat, a front spout of rectangular form of the same width as said body, a screw-threaded wall internally at a central point between said valve-seat and the front end of said body, an annular fluid space at either side of said central threaded portion, a straight perpendicular leak duct open to the front fluid space and the spout, and a main discharge passage of rectangular form extending downwardly from the rear fluid space and thence forwardly along the bottom of said body and downwardly into the spout, in combination with a recessed screw-cap having a central opening, and a valve having screw threads for coöperation with said screw threaded wall and a reduced stem with a stop collar adapted to seat in said recess and a handle.

6. A relatively small faucet made in three parts, comprising a short and straight tubular body, an end cap, and a valve stem, said body having a valve-seat at its base and a rectangular spout and a leak duct at its extreme front end and a rectangular discharge passage extending along its bottom from said valve seat to said spout and terminating in line with the outlet end of the leak duct, whereby leakage at the stem and splattering at the spout is prevented and a solid large outflow of water is obtained in the small confines as limited by the size of the faucet.

7. In a faucet, a short and straight cylindrical body having a base flange and a valve seat and a screw-threaded extension axially thereof and provided with a relatively wide and short spout projected downwardly on straight lines at the extreme front end of said body apart from its base flange, said short body having a straight perpendicular aspirating passage at the extreme front thereof terminating in the spout and a relatively wide and long discharge passage extending downward at the valve seat and thence forward through the bottom of the body and thence turning downward to the spout.

In testimony whereof I affix my signature in presence of two witnesses.

JOSEPH H. GLAUBER.

Witnesses:
T. C. DOOLITTLE,
C. W. BRENNAN.

---

Copies of this patent may be obtained for five cents each, by addressing the "Commissioner of Patents, Washington, D. C."